United States Patent [19]

Dietz et al.

[11] Patent Number: 5,318,627
[45] Date of Patent: Jun. 7, 1994

[54] PROCESS FOR THE PREPARATION OF PIGMENT PREPARATIONS BASED ON C.I. PIGMENT VIOLET 23

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 117,353

[22] Filed: Sep. 7, 1993

Related U.S. Application Data

[63] Continuation of Ser. No. 855,219, Mar. 20, 1992, abandoned.

[30] Foreign Application Priority Data

Mar. 22, 1991 [DE] Fed. Rep. of Germany ....... 4109488

[51] Int. Cl.$^5$ .............................................. C08K 5/357
[52] U.S. Cl. .................................... 106/498; 106/493; 106/494; 544/99; 546/28
[58] Field of Search ....................... 106/498, 493, 494; 544/99; 546/28

[56] References Cited

U.S. PATENT DOCUMENTS

| | | | |
|---|---|---|---|
| 3,752,688 | 8/1973 | Fuchs et al. | 106/412 |
| 3,973,981 | 8/1976 | Miyatake et al. | 106/411 |
| 4,253,839 | 3/1981 | Spietschka et al. | 8/565 |
| 4,256,507 | 3/1981 | Kranz et al. | 106/465 |
| 4,310,359 | 1/1982 | Ehashi et al. | 106/494 |
| 4,986,852 | 1/1991 | Dietz et al. | 106/498 |

FOREIGN PATENT DOCUMENTS

| | | |
|---|---|---|
| 0321919 | 6/1989 | European Pat. Off. . |
| 0395988 | 11/1990 | European Pat. Off. . |
| 1137156 | 8/1965 | Fed. Rep. of Germany . |
| 2043820 | 8/1973 | Fed. Rep. of Germany . |
| 2500509 | 2/1976 | Fed. Rep. of Germany . |
| 2905114 | 7/1980 | Fed. Rep. of Germany . |
| 3106906 | 1/1982 | Fed. Rep. of Germany . |
| 2742575 | 5/1982 | Fed. Rep. of Germany . |
| 851976 | 10/1960 | United Kingdom . |

OTHER PUBLICATIONS

Patent Abstracts of Japan; vol. 6, No. 54 (C-97)(932) Apr. 9, 1982 & JP-A-56 167 762 (Toyo Ink Seizo) Dec. 23, 1981.

Patent Abstracts of Japan; vol. 13, No. 589 (C-670)(3937) Dec. 25, 1989 & JP-A-1 247 467 (Toyo Ink Mfg) Oct. 3, 1989.

Patent Abstracts of Japan; vol. 11, No. 96 (C-412)(2543) Mar. 26, 1987 & JP-A-61 246 261 (Toyo Ink Mfg) Nov. 1, 1986.

Patent Abstracts of Japan; vol. 13, No. 589 (C-670)(3937) Dec. 25, 1989 & JP-A-1 247 468 (Toyo Ink Mfg) Oct. 3, 1989.

*Primary Examiner*—Mark L. Bell
*Assistant Examiner*—Scott L. Hertzog

[57] ABSTRACT

In conventional dry milling of C.I. Pigment Violet 23, the environment is heavily polluted by the necessarily formed dusts, the resulting noise and vigorous vibration during the milling process.

According to the invention, it has now been found that these shortcomings can be avoided by carrying out the comminution of the base pigment by aqueous-alcoholic milling in the presence of beads and selected pigment dispersants derived from dioxazine compounds containing basic groups, followed by a solvent finish.

Such a combination of the two abovementioned treatment operations even makes it possible to increase the capacity without the need for any other expensive investments for constructional modifications of the equipment. The pigment preparations produced in this manner simultaneously result in an improvement of the colorant in the paint and especially in nitrocellulose gravure printing upon practical application, in particular in an improvement of the gloss and a reduction in abrasiveness, compared with commercial grades known in this area.

37 Claims, No Drawings

PROCESS FOR THE PREPARATION OF PIGMENT PREPARATIONS BASED ON C.I. PIGMENT VIOLET 23

This application is a continuation of our copending application, U.S. Ser. No. 07/855,219, filed Mar. 20, 1992, and now abandoned.

The present invention relates to a particularly environmentally safe and economical process for the preparation of pigment preparations comprising a combination of C.I. Pigment Violet 23 (No. 51 319) and pigment dispersants based on dioxazine compounds having basic groups. The process products thus accessible serve as colorants for pigmenting high-molecular-weight materials, in particular paints, plastics and printing inks; they are distinguished by their excellent coloristic and rheological properties, such as dispersibility, flocculation stability, rheology, gloss behavior and color strength.

For the production of pigment preparations with the additional use of product specific pigment dispersants, a number of possibilities have been disclosed in the prior art:

According to the laid-open EP-PA 0,321,919, pigment preparations of this type are obtainable, for example, by the following process variants:

By addition of the pigment dispersants during
1. comminution (dry milling) of the highly crystalline crude pigments,
2. finishing of the finely divided prepigments prepared by dry milling in an aqueous or solvent-containing system,
3. dispersion of the finely divided pigments in the application medium or in an additional processing step.

While in the property right just discussed preference is given to the measures for treatment according to process variants 1 and 2, the procedure in U.S. Pat. No. 4,310,359 in turn recommends for the same process the addition of pigment dispersants of a chemically related type during dispersion of finely divided pigments in the application medium. However, when the last-mentioned procedure is used, the optimum of the desired properties is in many cases not reached. The use of pigment dispersants in the course of comminution of the highly crystalline crude pigments is also explained in U.S. Pat. No. 3,973,981. Comminution processes of this type mentioned therein are milling in the presence of salt in ball mills or vibrating mills and reprecipitation from concentrated sulfuric acid. However, this results in large amounts of salts or of dilute sulfuric acid in the waste water, which severely limits the economy of this process. U.S. Pat. No. 4,256,507 finally describes the production of pigment preparations by introducing the pigment dispersants during dry milling in ball mills with or without the addition of salt. Pigment preparations based on dioxazine pigments are not mentioned therein.

For comminution of dioxazine crude pigments obtained in highly crystalline form during synthesis, the following mechanical comminution processes have found wide application in practice:

Thus, for example, British Patent 851,976 discloses that crude pigments of this type can be finely milled in a ball mill by milling in the presence of salt using 4 to 10 parts of salt per part of crude pigment. However, this technique is relatively expensive and moreover involves a high pollution of the waste water as a result of the large amounts of salt which have to be removed as residue in the course of workup. In contrast to this procedure, U.S. Pat. No. 4,253,839 proposes to carry out the dry milling of highly crystalline dioxazine crude pigments in a vibrating mill and then subject the finely divided prepigments obtained to a solvent finish. The dust necessarily formed during milling and the resulting heavy noise pollution severely damages the environment in this case. In addition, the vigorous vibrations of vibrating mills have to be dampened by very complicated structural measures. In contrast to the two previous cases, U.S. Pat. No. 3,752,688 mentions, for the purpose of comminution, alkaline wet milling of crystalline crude pigments from the dioxazine series in the presence of an aqueous base. The grinding medium intended for the stirred ball mill comprises steel balls of 1-3 mm in diameter. Further specific data regarding milling are not given in the priority document, nor are any regarding pigment preparations which may be obtained in this manner. However, as far as we know, the pigments prepared by this process do not meet today's requirements of particle fineness and coloristic properties.

As can be concluded from the experience gained by experts studying this area, very generally the moment at which the pigment dispersants are added seems to be of particular importance for the intended property profile of the pigment preparations prepared in that particular manner. At least that much seems to be certain as technical teaching that by merely mixing the pigment dispersants with the pigments or by dry milling alone of the highly crystalline crude pigments in the presence of pigment dispersants, in most cases the optimum quality features of the pigments thus treated cannot yet be achieved. Similar reservations also apply to the application of the known comminution processes, where the formation of large amounts of dilute acids and salts, the heavy dusting and the troublesome vibrations in the case of dry milling and poor compatibility of the procedures discussed in this respect are seen as disadvantages.

Accordingly, the object of the present invention can be seen in overcoming the shortcomings recognized by the prior art of the previous methods for producing pigment preparations in the area of dioxazine compounds.

It has now been found that pigment preparations based on C.I. Pigment Violet 23 having excellent coloristic and rheological properties can be produced in a simple manner by wet milling of the crude pigments of the dioxazine compound named above in more detail, obtained in coarsely crystalline form upon drying of the moist presscake originating from pigment synthesis, in the presence of selected pigment dispersants first in a liquid medium in a stirred ball mill until a certain minimum degree of particle fineness of the resulting pigment particles has been reached, and then directly subjecting the suspension of the mill base thus obtained, in the case of isolation of the intermediate after its redispersion in a liquid, to a conventional finishing treatment at elevated temperature with the participation of organic solvents, it being possible for the addition of the pigment dispersants to take place at any desired time in the course of the two treatment operations defined above. The measures taken in the claimed process for the purpose of formulating the base pigment of the formula I achieve a simple and elegant combination of comminution and finish.

For the preparation according to the invention of these pigment preparations, a high milling efficiency is required, which is achieved by using a specific design of the stirred ball mill, in combination with maintaining specified milling and finishing conditions. Suitable mills for milling of the desired efficiency are stirred ball mills designed for batchwise or continuous operation and comprising a cylinder-like or hollow cylinder-like milling space in horizontal or vertical construction, which mills can be operated at a specific power density of more than 2.5 kW per liter of milling space and whose peripheral speed of the stirrer is more than 12 m per second. The energy given off by the stirrer per time unit is transferred to the mill base as comminution work and as frictional energy in the form of heat. In order to remove this large amount of heat without difficulty, the ratio of milling space to surface area of the milling space (cooling area) must be kept to a minimum by structural measures.

The grinding medium used comprises balls made of zirconium oxide, zirconium mixed oxide, alumina or quartz having a diameter of $\leq 1$ mm; advantageously, those having a diameter of 0.2 to 1 mm, preferably 0.3 to 0.5 mm, are used.

When continuous stirred ball mills are used for comminution, the grinding medium is preferably separated from the mill base by centrifugal separation, so that the separation devices virtually do not come into contact with the grinding medium, which makes it possible to substantially prevent them from clogging. The stirred ball mills are operated at a high degree of filling of the grinding medium. In continuous stirred ball mills, the milling space is virtually completely taken up by the grinding medium.

For milling, in accordance with the process, the highly crystalline crude pigments formed in the synthesis and having an X-ray index of $>90$ are used, which pigments are present after the milling process as finely divided prepigments or prepigment compositions of this type having a crystallinity in accordance with an X-ray index of $\leq 9$. The pigment concentration in the mill base should be $\leq 40\%$ by weight, in general 10 to 35% by weight, preferably between 10 and 20% by weight. Milling is carried out in an aqueous, aqueous/organic or organic medium of the solvent type, preferably in an alkaline or neutral pH range. In addition to the liquid phase and the crude pigment, the mill base can additionally contain pigment dispersants, surfactants and other additives. Depending on the fineness required, the residence time of the mill base in the stirred ball mill is in general between 10 and 60 minutes; advantageously, the time is 10 to 45 minutes, preferably 10 to 30 minutes. Milling is carried out at temperatures in the range from 0° to 100° C., advantageously at a temperature of between 10° and 60° C., preferably at 20° to 50° C. The liquid grinding medium used is water; water-miscible $C_1$-$C_4$-alkanols, such as, for example, methanol, ethanol, n-propanol, isopropanol, n-butanol, tert.-butanol or isobutanol; cyclic alkanols, such as, for example, cyclohexanol; $C_1$-$C_6$-dialkyl ketones, such as, for example, acetone, diethyl ketone, methyl isobutyl ketone or methyl ethyl ketone; ethers and glycol ethers, such as, for example, methylglycol, ethylglycol, butylglycol, ethyldiglycol or methoxybutanol; aliphatic acid amides, such as, for example, formamide or dimethylformamide; cyclic carboxamides, such as, for example, N-methylpyrrolidone, valero- and caprolactam, heterocyclic bases, such as, for example, pyridine, morpholine or picoline; or dimethyl sulfoxide or mixtures of these solvents with water; in particular, a solution of isobutanol in water, for example 5% isobutanol, is preferred.

Addition of the pigment dispersant can take place all at once or in several portions; it can take place before, during or after milling. The most suitable moment must be determined in advance by orienting tests. Preferably, the addition of the pigment dispersants is carried out during the last third of milling; they can take place in dry form or in the form of a moist presscake.

Pigment dispersants used are those based on the dioxazine compound of the formula I on which the preparations are based,

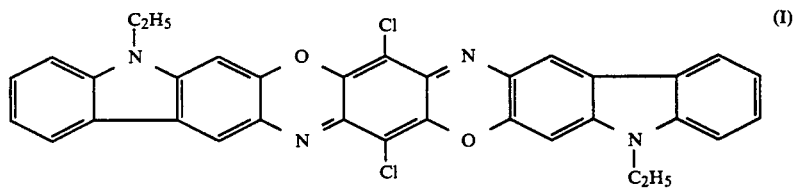

which have the formula II,

in which

Q is an m-valent radical of the base structure in accordance with formula I,

Y is a bridge-forming grouping from the series —$CH_2$—, —$CHR^1$—, —$CR^1R^2$—, substituted or unsubstituted phenylene (in particular 1,4-phenylene), —CO—, —$SO_2$— or —$NR^3$—, or a multiple sequence of alkylene or a combination of at least two of such bridging members of different types, which may be repeated, such as, for example, —$SO_2$—$NR^3$—$(CH_2)_p$—, —CO—$NR^3$—$(CH_2)_p$—, —$CH_2$—$NR^3$—$SO_2$—$(CH_2)_n$—, —$CH_2$—$NR^3$—CO—$(CH_2)_n$— or —$CH_2$—$NR^3$—CO—$CH_2$—NH—$(CH_2)_n$, in which $R^1$ and $R^2$ are identical or different $C_1$-$C_4$-alkyl and $R^3$ is hydrogen or $C_1$-$C_4$-alkyl, and n and p, independently of one another, are each numerical values from 1 to 6, X is the radical of an aliphatic or aromatic, five- or six-membered heterocyclic system bound to bridging member Y via a carbon atom and each containing 1 to 3 identical or different hetero atoms belonging to the ring from the series comprising nitrogen, oxygen or sulfur, which, if desired, can additionally contain a benzo-fused ring and be substituted by $C_1$—$C_4$-alkyl, $C_2$-$C_4$-alkenyl, $C_1$-$C_3$-hydroxyalkyl or phenyl, as in the case of heterocyclic five-membered rings, for example, of the furan, thiophene, pyrrole, pyrazole, thiazole, oxazole, triazole and in particular imidazole type, or in the case of additionally fused heterocycles, for example, of the thionaphthene, benzoxazole, benzothiazole, benzimidazole, benzotriazole and in particular indole type, or is a phthalimido radical bound to bridging member Y via the imide nitrogen, which may be substituted on the benzenoid ring by a maximum of four substituents such as chlorine, bromine, nitro, carboxyl,N-($C_1$-$C_5$-alkyl)carbamoyl,N-phenylcarbamoyl or benzoylamino, or is a radical having the structure

in which $R^4$ and $R^5$ each individually and independently of one another are each hydrogen, substituted or unsubstituted $C_1$-$C_{20}$-alkyl or $C_2$-$C_{20}$-alkenyl, $C_5$-$C_6$-cycloalkyl, substituted or unsubstituted phenyl, benzyl or naphthyl, or in which $R^4$ and $R^5$ jointly or together with the adjacent N atom form an aliphatic or aromatic, five- or six-membered heterocyclic system each having 1 to 3 identical or different hetero atoms belonging to the ring from the series comprising nitrogen, oxygen or sulfur, such as, for example, of the pyrroline, pyrrolidine, piperidine, morpholine and in particular imidazole type, and m is a numerical value of between 0.1 and 4, in which in the case of the multiple presence (m>1) of components X and Y in the dispersants of the formula II the meaning of the symbols just mentioned does not have to be identical. However, if a plurality radicals of the type mentioned are present, they will preferably have the same meaning with respect to the structural principle.

Pigment dispersants of the structural principle $Q[-Y-X]_m$ (II) defined in the beginning which have acquired particular interest for carrying out the process according to the invention are dioxazine compounds in which Q has the meaning given above, Y is one of the bridge-forming groupings having the structure —$CH_2$—NH—CO—$CH_2$—NH—$(CH_2)_{2-3}$— or —$SO_2$—NH—$(CH_2)_{2-3}$—, X is imidazolyl bound to bridging member Y via the imide nitrogen or a radical of the structure

in which $R^4$ and $R^5$ are identical or different $C_1$-$C_6$-alkyl, $R^4$ and $R^5$ preferably being identical, and m is a numerical value from 0.5 to 4.

Dioxazine compounds from the class of pigment dispersants of the $Q[-Y-X]_m$ (II) type which are considered extremely valuable for the preparation of pigment preparations according to the invention are those which can be described by the formula III

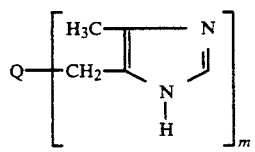

III in which

Q has the meaning given above and m is a numerical value from 0.5 to 4.

The variants of pigment dispersants defined above are added according to the invention in amounts of 0.1 to 25% by weight, advantageously 1 to 15% by weight, preferably about 3 to 10% by weight, relative to the crude pigment of the base structure according to formula I. According to the process, this addition can take place as early as during the milling process or can be delayed and take place during the subsequent finishing operation. Mixtures of pigment dispersants of the formula II having different structures can also be used for this purpose.

The finely divided prepigments or prepigment compositions present after milling are, if desired, after addition of the abovementioned pigment dispersants in aqueous suspension or in particular after admixture of the organic solvents, subjected to a heat treatment (solvent finish).

Examples of suitable solvents for such a finish are: $C_1$-$C_{10}$-alkanols, such as, for example, methanol, ethanol, propanol, n- or i-butanol; $C_1$-$C_6$-dialkyl ketones or cyclic ketones, such as, for example, dimethyl ketone, diethyl ketone, methyl isobutyl ketone, methyl ethyl ketone or cyclohexanone; ethers and glycol ethers, such as, for example, ethylene glycol monomethyl or monoethyl ether and propylene glycol monomethyl or monoethyl ether, butylglycol, ethyldiglycol or methoxybutanol; aromatic hydrocarbons, such as, for example, toluene, xylenes or ethylbenzene; aromatic chlorohydrocarbons, such as, for example, chlorobenezene, o-dichlorobenzene, 1,2,4-trichlorobenzene or bromobenzene; substituted aromatics, such as, for example, nitrobenzene or phenol; aliphatic carboxamides, such as, for example, formamide or diemthylformamide; cyclic carboxamides, such as, for example, N-methylpyrrolidone; $C_1$-$C_4$-alkyl carboxylates, such as, for example, butyl formate, ethyl acetate or propyl propionate; $C_1$-$C_4$-alkyl benzoates, such as, for example, ethyl benzoate; heterocyclic bases, such as, for example, pyridine, morpholine or picoline; and dimethyl sulfoxide and sulfolane, Preferred organic solvents in this respect are alkanols, such as, for example, ethanol, propanol, butanolas and pentanols.

The conditions to be employed for carrying out the solvent finish are dependent to a high degree on the desired properties of the pigment preparation and are in each case adjusted corresponding. Normally, the suspension of the prepigment composition in the particular medium is treated at a temperature in the range from between 50° and 200° C., if appropriate under elevated pressure, for 1 hour to 24 hours. In general, to this end, the suspension obtained after wet milling is used without intermediate isolation of the mill base. The amount of solvent added can vary within wide limits. Preferably, the same or up to 5 times the amount by weight of the solvent, relative to the weight of the prepigment composition, is used. The heat treatment in the aqueous-organic medium is advantageously carried out at 50° to 150° C. for a duration of 1 to 6 hours. After completion of the finish, the solvents used therefore are recovered and used again. The pigment preparations thus obtained are preferably isolated from a weakly alkaline suspension. By taking advantage of the scope for variation available in this manner, the prepigment compositions obtained by the process according to the invention can be converted, depending on the particular application, into a more covering or more transparent form, which can be regulated via the solution power of the solvent under consideration, its concentration, selection of the temperature and duration of the finishing treatment.

The preparation of pigment preparations based on C.I. Pigment Violet 23 by the process claimed has proven to be particularly economical and environmentally safe, because, on the one hand, the comminution of the crude pigment by wet milling does not lead to pollution of the air, due to formation of dust, and, on the other hand, no waste disposal problems arise, since only small amounts of chemicals and solvents are used which are subsequently further processed or can be regenerated completely.

The pigment preparations obtainable by the present invention are distinguished by their excellent coloristic and rheological properties, in particular flocculation stability, dispersibility, rheology, gloss behavior and color strength.

The pigment preparations prepared according to the invention can be used for pigmenting (coloring) high-molecular-weight organic materials of natural or synthetic origin:

Examples of high-molecular-weight organic materials which can be colored by the pigment preparations mentioned are cellulose ethers and esters, such as ethylcellulose, nitrocellulose, cellulose acetate or cellulose butyrate, natural resins or synthetic resins, such as polymerization resins or condensation resins, for example amino resins, in particular urea/- and melamine/formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, caseine, silicone and silicone resins, individually or in mixtures. It is irrelevant whether the high-molecular-weight organic compounds mentioned are present as plastic compositions, melts or in the form of spinning solutions, paints, varnishes or printing inks. Depending on the particular application, it has proven advantageous to use the pigment preparations obtained according to the invention as toners or in the form of preparations or dispersions. Based on the high-molecular-weight organic material to be pigmented, the preparations of compounds present of the formula I mentioned are used in an amount of, preferably, 0.1 to 10% by weight. Particularly preferred coating systems in this respect are baking enamels from the class of alkyd/melamine resins or acrylic resin varnishes and two-component paints based on acrylic resins crosslinked with polyisocyanate. Of the large number of printing inks which can be pigmented, printing inks based on nitrocellulose may be mentioned in particular.

The pigment preparations prepared according to the invention are easily dispersible to high degrees of fineness in many application media. Dispersions of this type have high flocculation stability and show excellent rheological properties even when highly pigmented. They can be used to obtain coatings and prints of high color strength, high gloss and high transparency having excellent fastness properties.

In order to test the properties of the pigment preparations produced by the invention on the coating sector, from the large number of known systems, an alkyd/melamine resin varnish (AM6) based on medium-oil, non-drying alkyd resin comprising synthetic fatty acids and phthalic anhydride and on a melamine resin etherified with butanol and portions of a non-drying alkyd resin based on ricinenic acid (short-oil) and an acrylic resin baking enamel based on a non-aqueous dispersion (TSA) were selected. In the examples below, they are referred to as AM6 and TSA. Rheology of the mill base after dispersion was evaluated using the following five-step scale:

| 5 thin liquid | 2 slightly solidified |
|---|---|
| 4 liquid | 1 solidified |
| 3 thick liquid | |

After dilution of the mill base to the final pigment concentration, the viscosity was evaluated, using a Rossmann viscospatula, type 301 from Erichsen. Gloss measurements were carried out on cast films under an angle of 20° according to DIN 67530 (ASTMD 523), using a "multigloss" measuring device from Byk-Mallinckrodt.

In the examples below, parts and percentages are in each case by weight of the substances thus described. The generic name used for identification of the dioxazine compound C.I. Pigment Violet 23 used according to the invention as colorant and the corresponding C.I. number 51319 can be seen in the COLOUR INDEX, 3rd edition, 1971, Volume 4.

The coarsely crystalline crude pigment used according to the examples as starting material was prepared by the procedure given in BIOS Final Report 960, page 75 and in this form had an X-ray index of 92. Unless stated otherwise, the crude pigment was in salt-free form. The degree of particle fineness of the prepigment compositions was determined via the X-ray diffraction spectrum, using the method given in U.S. Pat. No. 4,253,839.

EXAMPLE 1

85 g of 5% isobutanol and 15 g of crude pigment (Pigment Violet 23) are introduced in succession into a stirred ball mill of the ®Drais PML type (manufactured by Draiswerke GmbH, Mannheim), which is filled with 336 g of zirconium mixed oxide beads of diameter 0.3–0.4 mm as grinding medium, and the mixture is milled therein at a peripheral speed of the stirrer of 15.6 m/s and at a specific power density of 3.1 kW per liter of milling space at 25° C. for 25 min. 5.1 g of pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is then rinsed with water, and the combined suspensions of the mill base are filtered off with suction. The X-ray index of the prepigment composition is 6.10. For the finish operation, the filter residue is taken up in 120 ml of water, 45 g of 100% isobutanol are added, and the mixture is first additionally stirred at 25° C. for 24 hours. The mixture is then brought to boiling, kept at the boiling temperature for 5 hours with further stirring, and the isobutanol is then distilled off azeotropically by heating to up to 100° C. at the distillation head. After cooling to 60° C., the distillation residue is brought to a pH of 9 with 10% sodium hydroxide solution, after which stirring at 60° C. is continued for 1 hour. The finished product is finally filtered off with suction, washed neutral by treatment with water and dried at 80° C.

This gives 14.7 g of a pigment preparation which produces coatings of high color strength when tested with AM6 varnish. The rheology of the varnish is given a rating of 5. Gloss measurement gives a value of 85.

Comparison a

Without addition of the pigment dispersant, the procedure of Example 1 gives a pigment which produces covering coatings of low color strength with AM6 varnish. The rheology of the varnish is given a rating of 4. The gloss value is 39.

Comparison b

The procedure of comparison a is repeated, but without pigment dispersant, and the pigment produced is afterwards mixed with 10% of the above pigment dispersant in dry form, giving a pigment preparation producing covering coatings of low color strength with AM6 varnish. The rheology of the varnish is given a rating of 5. The gloss value is 85.

Comparison c

When the measures for comminution of the crude pigment according to Example 1 are repeated under the milling conditions described in U.S. Pat. No. 3,752,688 (alkaline wet milling, steel balls of 3 mm in diameter, milling time 1 hour), a highly covering pigment of low color strength is obtained after workup of the mill base.

EXAMPLE 2

A stirred ball mill of the Drais PML type, which is filled with 336 g of zirconium mixed oxide beads of diameter 0.3–0.4 mm, is successively charged with 75 ml of water, 15 g of crude pigment (Pigment Violet 23) and 10.1 g of the pigment dispersant of formula III, in which m is the number 1.5, as a 29.7% water-moist presscake. This mixture is then milled at a peripheral speed of the stirrer of 15.6 m/s and a specific power density of 3.1 kW per liter of milling space at 25° C. for 30 minutes. The grinding medium is then removed from the suspension of the mill base by screening, the grinding medium is rinsed with water, and the combined suspensions of the mill base are filtered off with suction. The X-ray index of the prepigment composition is 5.95. The filter residue is then subjected, for finishing, to the action of solvents according to Example 1, and the finished product is then isolated in the manner described there.

This gives 17.2 g of a pigment preparation which produces coatings of high color strength with AM6 varnish. The rheology of the varnish is given a rating of 5. The gloss value is 81.

EXAMPLE 3

90 l of water are initially introduced into a stirred vessel, and 30 kg of crude pigment (Pigment Violet 23) are added. The suspension formed is then milled in a stirred ball mill of the Drais DCP-3 type, which is equipped with 26.5 kg of zirconium mixed oxide beads of diameter 0.3–0.4 mm as grinding medium and operated at a peripheral speed of the stirrer of 17.1 m/s and a specific power density of 3.3 kW per liter of milling space, at a throughput of 220 kg/h at 50°–60° C. for 2.5 hours with recirculation. During milling, the viscosity of the suspension of the mill base is kept constant by adding 30 l of water in portions. The X-ray index of the prepigment is 1.20. For finishing, 1000 g of the suspension formed of the mill base are initially introduced into a stirred vessel, 10 g of 98% formic acid and 600 g of 100% isobutanol are added in succession, and the mixture is first additionally stirred at 25° C. for 22 hours. The mixture is then heated to boiling and kept at the boiling temperature for another 5 hours with stirring. It is then cooled to 80° C., and 67.3 g of the pigment dispersant of the formula III, in which m is the number 1.5, are then added as a 29.7% water-moist presscake, after which the isobutanol is distilled off azeotropically by increasing the temperature to up to 100° C. at the distillation head. The residue is cooled to 60° C., brought to a pH of 9 with 10% sodium hydroxide solution and stirred at 60° C. for another hour. Finally, the finished product is filtered off with suction, washed neutral and dried at 80° C. This gives 219.5 g of a pigment preparation which produces coatings of high color strength with AM6 varnish. The rheology of the varnish is given a rating of 5. The gloss value is 82.

EXAMPLE 4

250 g of the suspension of the mill base prepared by the procedure of Example 2 are initially introduced into a stirred autoclave for finishing, and 2.5 g of 98% formic acid and 150 g of 100% butanol are fed in successively. The mixture is heated to 125° C. and stirred at this temperature for 3 hours. It is then allowed to cool to 80° C., 16.8 g of the pigment dispersant of the formula III, in which m is the number 1.5, are introduced as a 29.7% water-moist presscake, and the isobutanol is removed by azeotropic distillation at temperatures of up to 100° C. at the distillation head. The residue is then cooled to 60° C., brought to a pH of 9 with 10% sodium hydroxide solution and stirred at 60° C. for another hour. The finished product is filtered off with suction, washed neutral and dried at 80° C.

This gives 54.6 g of a pigment preparation which produces coatings of high color strength with TSA varnish. The rheology of the enamel is given a rating of 5. The gloss value is 81.

EXAMPLE 5

A stirred ball mill of the Drais PML type, which is filled with 336 g of zirconium mixed oxide beads of diameter 0.3–0.4 mm, is charged successively with 90 g of 5% isobutanol and 10 g of crude pigment (Pigment Violet 23). This mixture is then milled at a peripheral speed of the stirrer of 15.6 m/s and a specific power density of 3.1 kW per liter of milling space at 25° C. for 10 minutes. 3.4 g of the pigment dispersant of the formula III, in which m is the number 1.5, are then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.90.

For finishing, the filter residue is taken up in 90 ml of water, 30 g of 100% isobutanol are added, and the mixture is first additionally stirred at 25° C. for 24 hours. The mixture is then brought to boiling and maintained at the boiling temperature for 5 hours with further stirring, after which the isobutanol is distilled off azeotropically by heating to up to 100° C. at the distillation head. After cooling to 60° C., the distillation residue is brought to a pH of 9 with 10% sodium hydroxide solution and stirred at 60° C. for another hour. The resulting product is filtered off with suction, washed neutral and dried at 80° C.

This gives 10.4 g of a pigment preparation which produces coatings of high color strength with AM6 varnish. The rheology of the varnish is given a rating of 5. The gloss value is 83.

EXAMPLE 6

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 12.1 m/s and a specific power density of 2.6 kW per liter of milling space at 25° C. for 25 minutes. 5.1 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.50. The filter residue is then subjected, for finishing, to the action of solvents according to Example 1, and the finished product is then isolated in the manner described there. This gives 14.8 g of a pigment preparation which produces coatings of high color strength with AM6 varnish. The rheology of the varnish is given a rating of 5. The gloss value is 83.

EXAMPLE 7

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 50° C. for 25 minutes. 5.1 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 7.45. The filter residue is then subjected, for finishing, to the action of solvents according to Example 1, and the finished product is then isolated in the manner described there. This gives 13.8 g of a pigment preparation which produces coatings of high color strength with AM6 varnish. The rheology of the varnish is given a rating of 5. The gloss value is 82.

EXAMPLE 8

A stirred ball mill of the Drais PML type, which is filled with 227 g of quartzite beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 5.1 g of the pigment dispersant of the formula III, in which m is the number 1.5, are then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.05. The filter residue is then subjected, for finishing, to the action of solvents according to Example 1, and the finished product is then isolated in the manner described there.

This gives 15.9 g of a pigment preparation which produces coatings of high color strength with AM6 varnish. The rheology of the varnish is given a rating of 5. The gloss value is 84.

EXAMPLE 9

A stirred ball mill of the Drais PML type, which is filled with 336 g of zirconium mixed oxide beads of diameter 0.6–1.0 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 5.1 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.00. The filter residue is then subjected, for finishing, to the action of solvents according to Example 1, and the finished product is then isolated in the manner described there. This gives 15.7 g of a pigment preparation which produces coatings of high color strength with AM6 varnish. The rheology of the varnish is given a rating of 5. The gloss value is 80.

EXAMPLE 10

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 40 minutes. 5.1 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 5.80. The filter residue is then subjected, for finishing, to the action of solvents according to Example 1, and the finished product is then isolated in the manner described there. This gives 14.4 g of a pigment preparation which produces coatings of high color strength with AM6 varnish. The rheology of the varnish is given a rating of 5. The gloss value is 83.

EXAMPLE 11

A stirred ball mill of the Drais PML type, which is filled with 336 g of zirconium mixed oxide beads of diameter 0.3–0.4 mm, is charged successively with 85 g of 5% isobutanol and 15 g of crude pigment (Pigment Violet 23) and brought to a pH of 3 by addition of 98% formic acid. This mixture is then milled at a peripheral speed of the stirrer of 15.6 m/s and a specific power density of 3.1 kW per liter of milling space at 25° C. for 25 minutes. 5.1 g of the pigment dispersant of the formula III, in which m is the number 1.5, are then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.00.

For finishing, the filter residue is taken up in 120 ml of water, 45 g of 100% isobutanol are added, brought to a pH of 3 by addition of 98% formic acid, and the mixture is first additionally stirred at 25° C. for 24 hours. The mixture is then brought to boiling and maintained at the boiling temperature for 5 hours with further stirring, after which the isobutanol is distilled off azeotropically by heating to up to 100° C. at the distillation head. After cooling to 60° C., the distillation residue is brought to a pH of 9 with 10% sodium hydroxide solution and stirred at 60° C. for another hour. The finished product is filtered off with suction, washed neutral and dried at 80° C.

This gives 15.3 g of a pigment preparation which produces coatings of high color strength with AM6 varnish. The rheology of the composition is given a rating of 4–5. The gloss value is 83.

EXAMPLE 12

A stirred ball mill of the Drais PML type, which is filled with 336 g of zirconium mixed oxide beads of diameter 0.3–0.4 mm, is charged successively with 85 g of 5% isobutanol, 0.85 g of sodium hydroxide and 20.4 g of crude pigment (Pigment Violet 23) (73.4% pure, containing 26.6% of salt from the synthesis). This mixture is then milled at a peripheral speed of the stirrer of 15.6 m/s and a specific power density of 3.1 kW per liter of milling space at 25° C. for 25 minutes. 2.5 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.60.

The measures for finishing by solvent treatment of the filter residue and for isolation of the product resulting therefrom are carried out in the same manner as described in Example 11.

This gives 15.0 g of a pigment preparation which produces prints of high color strength and high gloss in nitrocellulose gravure printing. The abrasion test on the abrasion tester AT 2 (manufactured by Schröder, Weinheim/Bergstr.) removes 1.1 mg of the chromium layer.

EXAMPLE 13

A stirred ball mill of the Drais PML type, which is filled with 336 g of zirconium mixed oxide beads of diameter 0.3–0.4 mm, is charged successively with 85 g of 5% isobutanol, 0.85 g of sodium hydroxide and 20.4 g of crude pigment (Pigment Violet 23) (73.4% pure, containing 26.6% of salt from the synthesis). This mixture is then milled at a peripheral speed of the stirrer of 15.6 m/s and a specific power density of 3.1 kW per liter of milling space at 25° C. for 25 minutes. 5.1 g of the pigment dispersant of the formula III, in which m is the number 1.5, is then added as a 29.7% water-moist presscake, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.70.

The measures for finishing by solvent treatment of the filter residue and for isolation of the product resulting therefrom are carried out in the same manner as described in Example 11.

This gives 15.5 g of a pigment preparation which produces coatings of very high color strength with AM6 varnish. The rheology of the composition is given a rating of 5. The gloss value is 84.

EXAMPLE 14

A stirred ball mill of the Drais PML type, which is filled with 336 g of zirconium mixed oxide beads of diameter 0.3–0.4 mm, is successively charged with 85 ml of methanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 1.5 g of the pigment dispersant of the formula III, in which m is the number 1.5, is then added, and wet milling is continued under the same conditions for another 5 minutes. The grinding medium is then removed from the suspension of the mill base by screening, the grinding medium is rinsed with methanol, and the combined suspensions of the mill base are filtered off with suction. The X-ray index of the prepigment composition is 8.00. For finishing, the filter residue is taken up in 120 ml of methanol and first additionally stirred at 25° C. for 24 hours. The mixture is then brought to boiling and maintained at the boiling temperature for 5 hours with further stirring, after which 300 ml of water are added and the methanol is distilled off azeotropically by heating to up to 100° C. at the distillation head. After cooling to 60° C., the distillation residue is brought to a pH of 9 with 10% sodium hydroxide solution and stirred at 60° C. for another hour. The finished product is filtered off with suction, washed neutral and dried at 80° C.

This gives 14.3 g of a pigment preparation which produces coatings of high color strength with AM6 varnish. The rheology of the composition is given a rating of 5. The gloss value is 84.

EXAMPLE 15

A stirred ball mill of the Drais PML type, which is filled with 336 g of zirconium mixed oxide beads of diameter 0.3–0.4 mm, is successively charged with 85 ml of acetone and 15 g of crude pigment (Pigment Violet 23). This mixture is then milled at a peripheral speed of the stirrer of 15.6 m/s and a specific power density of 3.1 kW per liter of milling space at 25° C. for 25 minutes. 1.5 g of the pigment dispersant of the formula III, in which m is the number 1.5, is then added, and wet milling is continued under the same conditions for another 5 minutes. The grinding medium is then removed from the suspension of the mill base by screening, and the grinding medium is rinsed off with acetone. The X-ray index of the prepigment composition is 8.95.

The combined suspensions of the mill base are first additionally stirred at 25° C. for 24 hours, then brought to boiling by heating and then stirred at the boiling temperature for another 5 hours. 300 ml of water are then added, and the acetone is distilled off azeotropically from this mixture while increasing the temperature to up to 100° C. at the distillation head. After cooling to 60° C., the distillation residue is brought to a pH of 9 with 10% sodium hydroxide solution and stirred at 60° C. for another hour. The finished product is filtered off with suction, washed neutral and dried at 80° C. This gives 15.0 g of a pigment preparation which produces coatings of high color strength with AM6 varnish. The rheology of the composition is given a rating of 5. The gloss value is 82.

EXAMPLE 16

A stirred ball mill of the Drais PML type, which is filled with 336 g of zirconium mixed oxide beads of diameter 0.3–0.4 mm, is successively charged with 85 ml of 50% diethylene glycol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 1.5 g of the pigment dispersant of the formula III, in which m is the number 1.5, is then added, and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 7.50. For finishing, the filter residue is taken up in 120 ml of 80% diethylene glycol and first additionally stirred at 25° C. for 24 hours. The mixture is then heated to 100° C. and stirred at 100° C. for another 5 hours. After cooling to 60° C., the mixture is brought to a pH of 9 with 10% sodium hydroxide solution and stirred at 60° C. for another hour. The finished product is filtered off with suction, washed neutral and dried at 80° C.

This gives 14.8 g of a pigment preparation which produces coatings of high color strength with AM6 varnish. The rheology of the composition is given a rating of 5. The gloss value is 82.

EXAMPLE 17

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 6.6 g of the pigment dispersant of the general formula II, in which Y is a $-CH_2 13$ group and X is a phthalimido radical and m is the number 2 (prepared analogously to U.S. Pat. No. 4,256,507), are added as a 22.8% water-moist presscake and wet milling is continued under the sam conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.40. The filter residue is then subjected, for finishing, to the action of solvents according to Example 1, and the finished product is then isolated in the manner described there. This gives 13.9 g of a pigment preparation which produces colorings of high color strength with PVC.

EXAMPLE 18

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 5.1 g of the pigment dispersant of the general formula II, in which Y is the grouping $-SO_2-NH-(CH_2)_2-$ and X is the radical $-N(CH_2-CH_3)_2$ and m is the number 2 (prepared according to U.S. Pat. No. 4,310,359 are added and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.20. The filter residue is then subjected, for finishing, to the action of solvents according to Example 1, and the finished product is then isolated in the manner described there. This gives 15.1 g of a pigment preparation which produces coatings of high color strength with AM6 varnish. The rheology of the composition is given a rating of 4–5. The gloss value is 75.

EXAMPLE 19

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. 1.5 g of the pigment dispersant of the general formula II, in which Y is the grouping $-CH_2-NH-CO-CH_2-NH-(CH_2)_3-$ and X is the 1-imidazolyl radical and m is the number 2.5 (prepared according to U.S. Pat. No. 3,973,981), are added and wet milling is continued under the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.09. The filter residue is then subjected, for finishing, to the action of solvents according to Example 1, and the finished product is then isolated in the manner described there. This gives 13.7 g of a pigment preparation which produces coatings of high color strength with AM6 varnish. The rheology of the composition is given a rating of 3–4. The gloss value is 72.

EXAMPLE 20

A stirred ball mill of the Drais PML type, which is filled with 336 g of zirconium mixed oxide beads of diameter 0.3–0.4 mm, is successively charged with 85 g of 5% isobutanol and 15 g of crude pigment (Pigment Violet 23). This mixture is then milled at a peripheral speed of the stirrer of 15.6 m/s and a specific power density of 3.1 kW per liter of milling space at 25° C. for 25 minutes. A mixture of 0.75 g of the pigment dispersant of the formula III, in which m is the number 1.5, and 0.75 g of the pigment dispersant of the general formula II, in which Y is the grouping —SO$_2$—NH—(CH$_2$)$_2$— and X is the radical —N(CH$_2$—CH$_3$)$_2$, and m is the number 2 (prepared according to U.S. Pat. No. 4,310,359) is added and wet milling is continued at the same conditions for another 5 minutes. The grinding medium is then removed from the suspension of the mill base by screening, the grinding medium is rinsed with water, and the combined suspensions of the mill base are filtered off with suction. The X-ray index of the prepigment composition is 6.80. The filter residue is then subjected, for finishing, to the action of solvents according to Example 1, and the finished product is then isolated in the manner described there.

This gives 14.8 g of a pigment preparation which produces coatings of high color strength with AM6 varnish. The rheology of the composition is given a rating of 5. The gloss value is 79.

We claim:

1. A process for the preparation of pigment preparations based on C.I. Pigment Violet 23 (No. 51 319) of the formula I

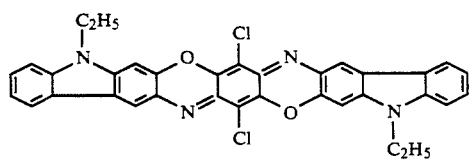

which process comprises the process steps of
  a) wet milling the coarsely crystalline pigments of the above dioxazine compound in the presence of pigment dispersants of the formula II Q[-Y-X]$_m$ (II)

in which
  Q is an m-valent radical of the base structure in accordance with formula I,
  Y is a bridge-forming grouping selected from the series consisting of —CH$_2$—, —CHR$^1$—, —CR$^1$R$^2$—, phenylene, —CO—, —SO$_2$—, or —NR$^3$—, or a multiple sequence of alkylene or a combination of such bridging members of different types, which may be repeated, in which R$^1$ and R$^2$ are identical or different C$_1$-C$_4$-alkyl and R$^3$ is hydrogen or C$_1$-C$_4$-alkyl,
  X is the radical of an aliphatic or aromatic, five- or six-membered heterocyclic system bound to bridging member Y via a carbon atom and each containing 1 to 3 identical or different hetero atoms belonging to the ring and being selected from the series consisting of nitrogen, oxygen and sulfur, which can additionally contain a benzo-fused ring and be substituted by C$_1$-C$_4$-alkyl, C$_2$-C$_4$-alkenyl, C$_1$-C$_3$-hydroxyalkyl or phenyl,
    or is a phthalimido radical bound to bridging member Y via the imide nitrogen, which may be substituted on the benzenoid ring by chlorine, bromine, nitro, carboxyl, N-(C$_1$-C$_5$-alkyl)carbamyol, N-phenylcarbamoyl or benzoylamino,
    or is a radical having the structure

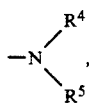

in
    which R$^4$ and R$^5$ each individually and independently of one another are each hydrogen, substituted or unsubstituted C$_1$-C$_{20}$-alkyl or C$_2$-C$_{20}$-alkenyl, C$_5$-C$_6$-cycloalkyl, substituted or unsubstituted phenyl, benzyl or naphthyl,
    or in which R$^4$ and R$^5$ jointly or together with the adjacent N atom form an aliphatic or aromatic, five- or six-membered heterocyclic system each having 1 to 3 identical or different hetero atoms belonging to the ring and being selected from the series consisting of nitrogen, oxygen or sulfur, and
  m is a numerical value of between 0.1 and 4,
  in which in the case of the multiple presence (m>1) of components X and Y in the dispersants of the formula II the meaning of the symbols just mentioned does not have to be identical,
  whose addition can take place at any desired time during the course of the combination of the two treatment operations comminution and finish (with the exception of other processing stages) defined below in more detail,
  first in an inert liquid medium in a stirred ball mill, which is operated at a power density of >2.5 kW per liter of milling space and a peripheral speed of the stirrer of >12 m/s, under the action of a grinding medium having a diameter of ≦1 mm, until the X-ray index as a measure of crystallinity of the resulting prepigment particles is ≦9,
  b) subjecting this prepigment composition in the form of the suspension of the mill base thus obtained or, in the case of isolation of the intermediate after previous dispersion in an inert organic or inorganic liquid, to a solvent finish treatment at elevated temperature and
  c) then isolating the finished pigment preparation.

2. The process as claimed in claim 1, wherein a grinding medium of diameter 0.2 to 1.0 mm is used.

3. The process as claimed in claim 1, wherein a grinding medium of diameter 0.3 to 0.5 mm is used.

4. The process as claimed in claim 1, wherein the pigment concentration in the mill base is ≦40% by weight.

5. The process as claimed in claim 4, wherein the pigment concentration in the mill base is 10 to 35% by weight.

6. The process as claimed in claim 4, wherein the pigment concentration in the mill base is 10 to 20% by weight.

7. The process as claimed in claim 1, wherein the inert liquid medium used is water, a water-miscible organic solvent or a combination thereof.

8. The process as claimed in claim 7, wherein the inert liquid medium is a solution of isobutanol in water.

9. The process as claimed in claim 1, wherein the pigment dispersant of the Q[-Y-X]$_m$(II) type used is a compound of the formula III

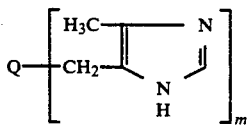

in which
Q has the meaning given in claim 1 and
m is a numerical value from 0.5 to 4.

10. The process as claimed in claim 1, wherein the pigment dispersant of the Q[-Y-X]$_m$(II) type used is a compound in which
Q has the meaning given in claim 1,
Y is a bridge-forming grouping having the structure —CH$_2$—NH—CO—CH$_2$—NH—(CH$_2$)$_{2-3}$— and
X is imidazolyl bound to the bridging member Y via the imide nitrogen or a radical having the structure

in which R$^4$ and R$^5$ are identical or different C$_1$–C$_6$-alkyl, and
m is a numerical value form 0.5 to 4.

11. The process as claimed in claim 1, wherein the pigment dispersant of the Q[-Y-X]$_m$(II) type used is a compound in which
Q has the meaning given in claim 1,
Y is a bridge-forming grouping having the structure —SO$_2$—NH—(CH$_2$)$_{2-3}$— and
X is imidazolyl bound to the bridging member Y via the imide nitrogen or a radical having the structure

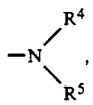

in which R$^4$ and R$^5$ are identical or different C$_1$–C$_6$-alkyl, and
m is a numerical value from 0.5 to 4.

12. The process as claimed in claim 1, wherein mixtures of pigment dispersants of the formula II of different structures are used.

13. The process as claimed in claim 1, wherein the pigment dispersants of the formula II are used in the form of a moist presscake.

14. The process as claimed in claim 1, wherein addition of the pigment dispersants of the formula II takes place all at once or in several portions.

15. The process as claimed in claim 14, wherein the pigment dispersants are added before, during or after wet milling.

16. The process as claimed in claim 15, wherein the pigment dispersants are added during the last third of the milling process.

17. The process as claimed in claim 1, wherein the pigment dispersants of the formula II are added in amounts of 0.1 to 25% by weight, relative to the crude pigment having the base structure of formula I.

18. The process as claimed in claim 17, wherein between 1 and 15% by weight of dispersant are used per weight unit of crude pigment.

19. The process as claimed in claim 17, wherein between 3 to 10% by weight of dispersant are used per weight of crude pigment.

20. The process as claimed in claim 1, wherein wet milling is carried out at pH values in the alkaline region.

21. The process as claimed in claim 1, wherein wet milling is carried out at temperatures in the range from 0° to 100° C.

22. The process as claimed in claim 21, wherein the milling process takes place at a temperature of between 10° and 60° C.

23. The process as claimed in claim 21, wherein the milling process takes place at a temperature of between 20° to 50° C.

24. The process as claimed in claim 1, wherein the residence time of the mill base for comminution in the stirred ball mill amounts to 10 to 60 minutes.

25. The process as claimed in claim 24, wherein the residence time of the mill base in the mill is between 10 and 45 minutes.

26. The process as claimed in claim 24, wherein the residence time of the mill base in the mill is between 10 and 30 minutes.

27. The process as claimed in claim 1, wherein alkanols are used as the organic solvent for the finishing treatment.

28. The process as claimed in claim 27, wherein the finishing solvent is isobutanol.

29. The process as claimed in claim 1, wherein the same or up to 5 times the amount by weight of solvent, relative to the weight of the prepigment composition, is used for the finishing treatment.

30. The process as claimed in claim 1, wherein the solvent finish treatment is carried out at pH values in the acidic range.

31. The process as claimed in claim 1, wherein the solvent finish treatment is carried out at temperatures in the range from 50° to 200° C. optionally under elevated pressure.

32. The process as claimed in claim 31, wherein the treatment temperature for the solvent finish is between 50° and 150° C.

33. The process as claimed in claim 1, wherein the duration of the treatment for the solvent finish is 1 hour to 24 hours.

34. The process as claimed in claim 33, wherein the duration of the treatment for the solvent finish is between 1 and 6 hours.

35. The process as claimed in claim 1, wherein the finished pigment preparation is isolated from a weakly alkaline suspension.

36. A pigment preparation obtained by a process as claimed in claim 1.

37. Method of using a pigment preparation as claimed in claim 36 as colorant by adding said pigment preparation to a paint, printing ink or plastic to be pigmented.

* * * * *